United States Patent Office 3,093,574
Patented June 11, 1963

3,093,574
ARSENIC REMOVAL FROM HYDROCARBONS
AND CONVERSION THEREOF
Ralph J. Bertolacini, Chesterton, and George W. Powers, Jr., Crown Point, Ind., assignors to Standard Oil Company, Chicago, Ill., a corporation of Indiana
No Drawing. Filed May 28, 1958, Ser. No. 738,304
7 Claims. (Cl. 208—91)

The present invention relates to removal of trace metal contaminants from hydrocarbon naphthas and, in particular, to a process for removing arsenic and/or lead from naphtha fractions which are subsequently contacted with a noble-metal catalyst (e.g., platinum-on-alumina catalyst).

Hydrocarbon naphthas often contain small quantities of metal contaminants, the presence of which creates problems in the subsequent conversion of the naphthas to finished products. For example, arsenic and/or lead in naphtha fractions which are subsequently contacted with a noble-metal catalyst may inhibit the catalytic properties of the catalyst. Such difficulties have been particularly pronounced in connection with reforming of naphtha fractions with catalysts comprising platinum-on-alumina, such as employed, for example, in the Ultraforming Process (Petroleum Engineer, volume XXVI, No. 4, April 1954, at page C-35).

Prior-art processes for removing arsenic and/or lead contaminants from hydrocarbon oil fractions suffer from one or more shortcomings. In some, for example, the naphtha must be in vapor phase, and/or organic arsenic compounds must first be converted by hydrogenation to arsenous hydride (arsine). In others, employing liquid mediums, e.g., sulfuric acid, the treatment requires stirring and/or may result in formation of emulsions which must, of course, be deemulsified. Other problems include excessive corrosion difficulties, introduction of undesired contaminants, inability to regenerate the treating medium, relatively-low contaminant-removal capacity, reduced efficiency when the hydrocarbon contains other impurities (e.g., water and/or nitrogen), and the like.

An object of the present invention is to provide a process for reducing the trace metal content (arsenic and/or lead) of hydrocarbon naphthas, which process does not suffer from the above difficulties. Another object is to provide a high-capacity, liquid-phase process for reducing the arsenic content of naphtha fractions, said process employing a treating medium which is regenerable. Still another object is to provide an improved method for converting arsenic-containing naphtha feedstocks in a process employing supported noble-metal catalyst. These and other objects of the present invention will become apparent as the detailed description proceeds.

In practicing the present invention, the arsenic-containing hydrocarbon naphtha is contacted in liquid phase with silica gel acidified with at least 20 percent by weight, based on silica gel, of sulfuric acid ($H_2SO_4$). A naphtha of reduced arsenic content is recovered, of which at least a portion is then subjected to conversion conditions in the presence of a noble-metal catalyst. The catalytic properties of the noble-metal catalyst are thus protected and catalyst life greatly enhanced. The sulfuric-acid-on-silica-gel treating medium employed in the present invention is capable of removing as much as 50 pounds of arsenic per ton of acidified silica gel, or more. Upon saturation with arsenic, the acidified silica gel may then be regenerated as hereinafter described in detail.

The silica gel employed in the practice of the present invention is the high-pore-volume, high-surface-area silica gel of commerce. It should preferably have a core volume of at least about 0.1 cc. per gram, e.g., 8 cc. per gram, and its surface area should be in excess of about 50 square meters per gram, e.g., 300 square meters per gram. Typically, such silica gel would have a pore diameter in the range of about 20 to 200 Angstroms and a bulk density of about 25 to 40 pounds per cubic foot. The silica gel should be substantially free of contaminants deleterious to noble-metal catalyst, e.g. nitrogen compounds, sulfur compounds, and the like. The silica gel is normally employed in small particulate form with particle sizes as small as 200 A.S.T.M. mesh (A.S.T.M. Designation, E11-39, part IIIA, pages 730-6, 1946), or smaller, preferably 5 to 30 mesh. In general, contacting-efficiency and pressure-drop considerations enter into the selection of particle size.

The silica gel should contain at least about 20 percent by weight, based on silica gel, of sulfuric acid, preferably 50 to 150 percent by weight. Sulfuric-acid levels much below 20 percent are substantially inoperative for purposes of the present invention. Sulfuric acid levels above about 150 percent may be used, particularly with silica gels having extremely high pore volumes and surface areas; but such excess sulfuric acid may lower the capacity of the silica gel to pick up metal contaminants by clogging the pores. Moreover, sulfuric acid in excess of that which can be readily adsorbed by the silica gel must in all cases be avoided. Otherwise, emulsions, polymerization products, and the like may form in the silica gel bed. In general, about 100 percent by weight, based on silica gel, of sulfuric acid has been found to give very satisfactory results. The sulfuric acid may be added to the silica gel by any means of the prior art, e.g., spraying, impregnation, percolation, and the like. Dilute sulfuric acid (e.g., 50–90 percent sulfuric acid) may be used for this purpose, but substantially concentrated sulfuric acid (e.g., 98 percent sulfuric acid) is usually preferred.

The purification and conversion process of the present invention is carried out with the hydrocarbon naphtha in liquid phase. So long as the oil is in liquid phase, the process is not temperature or pressure sensitive, although, temperature below about 200° F. are generally employed, e.g., about 100° F. Pressures may range from below atmospheric to pressures in excess of those employed in the subsequent conversion operation. Space velocity may be adjusted to achieve the desired level of contaminant removal, lower space velocities, of course, being more effective. In general, space velocities below 1,000 are required to obtain substantial purification, at least 50 percent arsenic removal being considered removal of at least a substantial portion of the arsenic content. Normally, space velocities of about 10 to 200 are employed when treating naphtha charge stocks which are subsequently upgraded by contact under reforming conditions with platinum-on-alumina catalysts.

If relatively-low space velocities are employed, economic operation may necessitate periodic regeneration of the catalyst, rather than discard. A number of regeneration schemes have been successfully employed; for example, when the acidified silica gel is no longer capable of effectively removing metal contaminants, the gel may be washed (e.g., with water) to remove sulfuric acid and most of the arsenic compounds, followed by an oxygen burn off at below about 1,000° F. Optionally, the water wash may be preceded by a hydrocarbon solvent wash, e.g., n-pentane, to remove organic decomposition products. Alternatively, after water washing, the catalyst may be steamed and then dried with hot flue gas. As still another alternative, the silica gel, after water washing, may be further washed with a solvent, such as, acetone, alcohols, or mixtures thereof, optionally in the presence of an aromatic solvent (e.g., benzene, toluene, and the like), and then dried with hot flue gas. Waste acid should, of course, be carefully neutralized, for example, with lime or chlorinated lime. Great care should be observed at all times because of the extreme toxicity of volatile arsenic compounds which may be produced, particularly when steam stripping. For reuse, the recovered silica gel is reimpregnated with fresh sulfuric acid, which may be conveniently carried out by simply percolating sufficient concentrated sulfuric acid through the silica gel to "wet" the silica gel with at least 20 percent by weight, based on silica gel, of sulfuric acid. In a regenerative system, at least two parallel beds of acidified silica gel are normally employed so that the beds may be alternated between contaminant removal and regeneration.

As hereinabove set forth, removal of arsenic and/or lead from hydrocarbon naphthas is particularly desirable when the naphtha is subsequently subjected to conversion in the presence of a catalyst containing a noble-metal. The noble-metal may comprise platinum, palladium, gold, silver rhodium, ruthenium, iridium, and the like, and mixtures, alloys, and the like thereof. In recent years, a number of reforming processes have been introduced which employ supported platinum catalysts. More recently, several isomerization processes have been announced wherein platinum and/or other noble metals on suitable supports are being employed. It is in combination with these reforming processes (particularly when processing virgin, in contrast to cracked, stocks) and/or isomerization processes that the naphtha purification method of the present invention is very advantageously employed.

When platinum is employed as the noble-metal, it is usually present in concentrations in about 0.05 to 1.0 percent by weight. It is usually supported on alumina, although other suitable metal-oxide supports may be employed, such as, silica gel, magnesia, zirconia, thoria, zinc oxide, and the like, including mixtures thereof, for example, silica-alumina, silica-zirconia, silica-alumina-zirconia, silica-alumina-magnesia, and the like. When employed for reforming, the noble-metal composites usually also contain halogen in amounts of about 0.1 to 2.0 percent by weight, usually in the form of chlorine or fluorine although bromine and iodine are not precluded. When the composites are employed for isomerization, halogen levels may be even higher, e.g., up to 5 percent by weight, normally about 1 to 4 per cent by weight.

Reforming conditions include pressures in the range of about 50 to 1200 p.s.i.g., temperatures in the range of about 800 to 1000° F., weight-hourly space velocities in the range of about 0.5 to 5, and hydrogen recycle rates in the range of about 1,000 to 10,000 standard cubic feet per barrel of naphtha. Isomerization reactions may also be carried out under these conditions, although lower temperatures, e.g., about 600 to 900° F. are usually employed to take advantage of more favorable equilibrium. Also, for isomerization of predominantly $C_5$ and $C_6$ naphthas, space velocities may be substantially higher, e.g., up to about 15, and hydrogen recycle rates substantially lower, e.g., as little as 50 standard cubic feet per barrel.

In a specific and preferred embodiment of the present invention, a hydrocarbon naphtha is percolated through a bed of silica gel acidified with about 100 percent by weight, based on silica gel, of sulfuric acid at a temperature of about 75 to 150° F., a pressure of about 1 to 10 atmospheres, and a volumetric space velocity of about 10 to 150. The purified naphtha which is recovered is thereafter subjected to reforming conditions in the presence of a catalyst comprising alumina, 0.2 to 1.0 percent by weight of platinum, and about 0.2 to 1.5 percent by weight of halogen, e.g., chlorine. As a result of arsenic and/or lead removal from the naphtha feedstock, catalyst life of the platinum-halogen-alumina catalyst is greatly enhanced.

The purification step of the present invention may also be employed as the initial step in an analytical procedure for determining the arsenic content of naphtha streams. For example, a sample of the naphtha to be analyzed is percolated through a column of silica gel containing about 100 percent by weight, based on silica gel, of sulfuric acid. The acidified silica gel and arsenic, which has been picked up from the percolated naphtha, is wet oxidized with sulfuric, nitric, and perchloric acids, thereby converting arsenic to the pentavalent state. Arsenic is then converted to the trivalent state by addition of potassium iodide and stannous chloride and finally converted to volatile arsine by addition of zinc and sulfuric acid. Arsine is then adsorbed in a solution of silverdiethyldithiocarbamate, forming a red complex which is measured colorimetrically.

The present invention will be more clearly understood and illustrated by the following examples:

*Example I*

Two tests were carried out using different samples of full-boiling-range naphthas which were also being charged to reforming units employing platinum-halogen-alumina catalysts. Prior to treating the naphthas in accordance with the present invention, platinum catalyst in the first reactor of the multi-reactor reforming units was found to have become substantially deactivated in far less time than might normally be expected. After treating the naphthas in accordance with the present invention, arsenic was removed, lead content was reduced, and catalyst life of the platinum catalyst greatly enhanced.

In the first test, 70 milliliters of the naphtha feedstock was percolated through a bed of 60 to 200 A.S.T.M. mesh silica gel acidified with about 100 percent by weight, based on silica gel, of sulfuric acid at a volumetric space velocity (volumes of feed per hour per volume of acidified silica gel) of about 11. In the second test, the naphtha sample was percolated through a similar bed of acidified silica gel (2.5 grams of silica gel impregnated with 2.5 grams of sulfuric acid) at the volumetric space velocity of about 135. For both tests ambient temperatures and essentially atmospheric pressures were employed. The resulting arsenic contents, expressed in parts per billion (p.p.b.), are as follows:

|  | Arsenic content of naphtha, p.p.b. | |
| --- | --- | --- |
|  | 1st test | 2nd test |
| Before treatment | 31 | 15 |
| After treatment | 0 | 0 |

These data show the excellent arsenic removal characteristic of the present invention. In both tests arsenic was removed completely and lead content was reduced substantially.

*Example II*

After a number of months of operation, the platinum-alumina catalyst in the first reactor of a reforming unit was found to be permanently deactivated. Analysis showed the deactivation to be caused in part by arsenic poisoning, the arsenic content of the top third of the bed averaging a very high 0.9 percent by weight, based on catalyst.

A guard chamber was thereafter installed, which chamber contained 8 to 10 A.S.T.M. mesh silica gel which had been impregnated with about 100 percent by weight, based on silica gel, of sulfuric acid in the form of 70 percent sulfuric acid. Reformer feed was charged to the guard chamber at about 100° F., essentially atmospheric pressure, and a volumetric space velocity of about 100. Analyses of charge and effluent from the guard chamber gave the following results:

Arsenic content of naphtha, p.p.b
Charge to guard chamber _____ 9
Effluent from guard chamber _____ 1

These data also illustrate the excellent arsenic removal characteristic of the method of the present invention. In addition, when the resulting purified naphtha is separate and charged to the platinum-alumina catalyst reforming zone, catalyst life of the platinum-alumina catalyst is more than doubled.

*Example III*

A series of experimental runs were made wherein an arsenic-containing reformer feedstock was charged to guard chambers, each containing a different type of treating medium. In one chamber 8 to 10 A.S.T.M. mesh silica gel impregnated with about an equal weight of sulfuric acid was employed. In a second chamber a similar bed of cobalt-molybdena-alumina (3 percent by weight CoO, 10 percent by weight $MoO_3$) was employed. In a third chamber a similar bed of phosphoric-acid-on-kieselguhr (roughly 50 percent phosphoric acid expressed as $P_2O_5$) was employed. In each case the naphtha was charged at about 100° F., essentially atmospheric pressure, and a volumetric space velocity of about 100. The results are as follows:

| Treating bed | Arsenic content of naphtha, p.p.b. | | Percent arsenic removal |
|---|---|---|---|
| | Before treatment | After treatment | |
| Sulfuric-acid-on-silica gel | 7.0 | 1.1 | 84 |
| Cobalt-molybdena-alumina | 7.0 | 5.5 | 21 |
| Phosphoric-acid-on-kieselguhr | 7.2 | 6.0 | 17 |

These data clearly demonstrate the surprising arsenic-removal selectivity of the treating medium of the present invention. In addition, top layers of the treating medium in the first and second guard chambers were analyzed for lead with the following results:

Treating bed:     Lead content, top layer of bed, weight percent
Sulfuric-acid-on-silica gel_____ 0.25
Cobalt-molybdena-alumina _____ 0.04

These data demonstrate the superior lead-removal selectivity of the sulfuric-acid-acidified silica gel.

*Example IV*

In still another series of test runs the contaminant-removal selectivity of silica gel acidified with sulfuric acid (about 100 percent by weight, based on silica gel, of sulfuric acid) was compared with that of activated charcoal. The test conditions were the same as employed in Example III, and the results were as follows:

| Treating bed | Arsenic content of naphtha, p.p.b. | | Lead content of naphtha, p.p.m. | |
|---|---|---|---|---|
| | Before treatment | After treatment | Before treatment | After treatment |
| Sulfuric-acid-on-silica gel | 23 | 7 | 0.07 | 0.02 |
| Activated charcoal | 23 | 23 | 0.07 | 0.07 |

These data again demonstrate the surprising selectivity of sulfuric-acid-on-silica gel for both arsenic and lead and the total ineffectiveness of activated charcoal.

*Example V*

A series of experimental runs were made to test the relative capacities of various adsorbents for arsenic removal under the same test conditions. In each run, heptane containing about 0.1 percent by weight of arsenic in the form of triphenylarsine was charged, at essentially ambient temperature and atmospheric pressure, to a 40 to 60 A.S.T.M. mesh bed of each adsorbent. Each bed contained 50 grams of adsorbent, and the charge rate was about 150 milliliters per hour. For each adsorbent the "break-through" capacity for arsenic removal was determined. This capacity is defined as the amount of arsenic removed by the adsorbent (pounds of arsenic/ton of adsorbent) before saturation of the bed occurs. The results are as follows:

| Treating adsorbent | Capacity for arsenic removal, lbs. of As/ton of adsorbent |
|---|---|
| Sulfuric-acid-on-silica gel | 50 |
| Attapulgus clay | 0.008–0.048 |
| Cobalt-molybdena-alumina | 11.2 |
| Activated alumina | 3.6 |

These data clearly show that sulfuric acid on silica gel has almost five-times the capacity of its closest competitor, in addition to its very superior selectivity, as demonstrated in Examples III and IV.

The above examples clearly show that a liquid-phase process capable of removing organic arsenic compounds from hydrocarbon naphthas has been achieved. No stirring is required; corrosion problems are at a minimum; no emulsions are encountered; no undesired contaminants are introduced; and the treating medium is not unduly sensitive to other impurities, has a relatively high capacity for contaminant removal, and is readily regenerated. Treating of hydrocarbon naphthas in accordance with the method of the present invention results in an improved process for converting arsenic-containing hydrocarbon naphthas over noble-metal catalysts, the improvement being particularly apparent in the form of improved catalyst life. Thus, it is apparent that the objects of the invention have been achieved.

While the invention has been described with reference to certain specific embodiments and operating examples, it is to be understood that such embodiments and examples are illustrative only and not by way of limitation. Numerous additional embodiments of the invention and alternative manipulative techniques and operating conditions will be apparent from the foregoing description to those skilled in the art.

In accordance with the foregoing description what is claimed is:

1. The method of converting an arsenic-containing hydrocarbon naphtha which comprises the step of contacting such naphtha in liquid phase with silica gel impregnated with at least about 20 percent by weight, based on silica gel, of sulfuric acid, under conditions to remove at least a substantial part of the arsenic from the naphtha, and thereafter subjecting at least a part of the resulting contacted naphtha to conversion conditions in the presence of a catalyst comprising a noble-metal.

2. The method of converting an arsenic-containing hydrocarbon naphtha which comprises treating the naphtha in liquid phase with silica gel containing about 50 to 150 percent by weight, based on silica gel, of sulfuric acid, under conditions effective for removing at least a substantial portion of the arsenic therefrom, and subjecting at least a part of the treated naphtha to conversion conditions in the presence of a catalyst comprising a noble metal and a metal oxide support.

3. The method of reforming an arsenic-containing hydrocarbon naphtha which comprises contacting the hydrocarbon naphtha in liquid phase with silica gel acidified with about 50 to 150 percent by weight, based on silica gel, of sulfuric acid, under conditions which effect removal of at least a substantial portion of the arsenic therefrom, separating a contacted naphtha fraction having an arsenic content substantially less than that of said hydrocarbon naphtha, and subjecting at least a portion of the separated naphtha to reforming conditions in the presence of a catalyst comprising platinum and alumina.

4. The method of reforming an arsenic-containing hydrocarbon naphtha which comprises contacting the hydrocarbon naphtha in liquid phase at a space velocity of below about 1,000 with silica gel acidified with at least about 20 percent by weight, based on silica gel, of sulfuric acid, recovering therefrom contacted naphtha having an arsenic content substantially less than that of said hydrocarbon naphtha, and treating the recovered naphtha at reforming conditions with a catalyst comprising alumina, 0.05 to 1.0 percent by weight of platinum, and 0.1 to 2 percent by weight of halogen.

5. A combination process which comprises the step of treating an arsenic-containing hydrocarbon naphtha in liquid phase at a temperature below about 200° F. and at a space velocity of about 10 to 200, with silica gel impregnated with about 100 percent by weight, based on silica gel, of sulfuric acid, recovering from said treating step a naphtha having an arsenic content substantially less than that of said hydrocarbon naphtha, and thereafter contacting said recovered naphtha fraction at reforming conditions with a catalyst comprising alumina, 0.05 to 1 percent by weight of platinum, and 0.1 to 2 percent by weight of halogen.

6. A combination process which comprises contacting an arsenic-containing hydrocarbon naphtha in liquid phase with silica gel impregnated with at least about 20 percent by weight, based on silica gel, of sulfuric acid, under conditions effective for removing at least a substantial portion of the arsenic from the naphtha, subjecting the contacted naphtha to conversion conditions in the presence of a catalyst comprising a noble-metal, periodically removing at least a portion of the silica gel from the contacting step, separating at least a portion of the sulfuric acid and at least a portion of any arsenic from the silica gel so removed, reimpregnating the resulting silica gel with fresh sulfuric acid so that the total sulfuric-acid content thereof is at least about 20 percent by weight, based on silica gel, and contacting additional hydrocarbon naphtha with the reimpregnated silica gel in the contacting step.

7. The method of claim 1 which includes periodically regenerating the silica gel by washing with water to remove sulfuric acid and arsenic compounds and re-impregnating the washed silica gel with sulfuric acid to provide at least 20 percent by weight of sulfuric acid based on silica gel, and resuming the contacting of the regenerated silica gel with naphtha.

References Cited in the file of this patent

UNITED STATES PATENTS

| | | |
|---|---|---|
| 1,602,703 | Pollock | Oct. 12, 1926 |
| 1,886,260 | Miller | Nov. 1, 1932 |
| 2,263,102 | Proell | Nov. 18, 1941 |
| 2,769,770 | Bicek | Nov. 6, 1956 |